(12) United States Patent
Koskiniemi (10) Patent No.: US 12,374,908 B2
(45) Date of Patent: Jul. 29, 2025

(54) PORTABLE DC POWER ADAPTER FOR FIELD ELECTRONICS USE

(71) Applicant: Erik Koskiniemi, Vancouver, WA (US)

(72) Inventor: Erik Koskiniemi, Vancouver, WA (US)

(*) Notice: Subject to any disclaimer, the term of this patent is extended or adjusted under 35 U.S.C. 154(b) by 532 days.

(21) Appl. No.: 17/670,465

(22) Filed: Feb. 13, 2022

(65) Prior Publication Data

US 2022/0263330 A1    Aug. 18, 2022

Related U.S. Application Data

(60) Provisional application No. 63/148,965, filed on Feb. 12, 2021.

(51) Int. Cl.
*H02J 7/00* (2006.01)
*H01R 24/84* (2011.01)

(52) U.S. Cl.
CPC .......... *H02J 7/0045* (2013.01); *H02J 7/0029* (2013.01); *H02J 7/0063* (2013.01); *H01R 24/84* (2013.01)

(58) Field of Classification Search
None
See application file for complete search history.

(56) References Cited

U.S. PATENT DOCUMENTS

| | | | |
|---|---|---|---|
| 2002/0105407 A1* | 8/2002 | Lee | H01H 85/20 337/186 |
| 2005/0153596 A1* | 7/2005 | VanWambeke | H01R 31/06 439/500 |
| 2012/0081067 A1* | 4/2012 | Burrell, IV | H01R 13/7175 320/107 |

* cited by examiner

*Primary Examiner* — Arun C Williams
(74) *Attorney, Agent, or Firm* — Mark E. Beatty; Rylander & Associates P.C.

(57) ABSTRACT

A portable power adapter includes a housing containing within it a battery chamber adapted to receive a selected battery pack, a circuit overload protector and a terminal connector selected to electrical couple to a selected DC load, and a mounting portion. A portable power adaptor may include an integrated voltage regulator, and a hermaphroditic SAE step connector. A portable power adaptor may include a plurality of power adapters electrically coupled to comprise a common power source and output.

6 Claims, 11 Drawing Sheets

Fig. 11

PORTABLE DC POWER ADAPTER FOR FIELD ELECTRONICS USE

CROSS REFERENCE TO EARLIER FILED APPLICATIONS

This application is a nonprovisional of, and claims priority to, U.S. Provisional Patent Application Ser. No. 63/148,965, filed Feb. 12, 2021, the disclosure of which is incorporated herein by reference.

FIELD OF THE INVENTION

The present invention relates to rechargeable battery-powered power adapters to supply electrical power to electronic devices in the field.

BACKGROUND OF THE INVENTION

Field teams of technicians often work in situations in which they are far from stable and reliable sources of electricity to operate electronic equipment for prolonged periods. Some vehicles provided 110 VAC outlets which accept the equipment charging cords, just as one would plug into a wall at an office. But this arrangement requires either using an electrical cable continuously plugged in to the vehicle—limiting the range of operation—or frequently returning to the vehicle (or another staging area) to plug and in wait while the equipment's internal battery recharges.

Many power tools now exist which are cordless and utilize interchangeable battery packs which can be swapped out with a fully charged battery pack when drawn down, while the low battery pack is recharged from the 110 VAC source. Such tool battery systems typically run at different volts/amps than typical electronic equipment, and electronic equipment are not adapted to connect to the unique size and shape of a tool battery pack. Additionally, the tool battery packs often supply voltage and amperage not compatible with the electronic equipment needs—which typically use lower voltages and require cleaner DC power with less voltage variation than tools. Physically, the dimensions and configurations of tool batteries are generally incompatible with electronic equipment connections.

It would be useful to provide apparatus to utilize selected tool battery systems for use by electronic equipment, by providing a DC power adaptor configured to receive a particular existing (or planned) tool battery system, which includes electrical connectors to connect to the electronic equipment using standard electronic power equipment cables and which can convert the tool battery power output to a voltage directly usable by the electronic equipment. It would also be useful to provide such an adapter with an integral voltage regulator to provide regulated DC voltage to especially sensitive equipment.

SUMMARY AND ADVANTAGES

An apparatus to adapt tool battery packs for use by electronic equipment includes a housing with a battery chamber configured to receive a selected battery pack or battery system, and electrical connectors to electrically couple the tool battery output to a selected piece or class of electronic equipment using a selected standardized electronic equipment electrical cable connector. The apparatus may include a voltage regulator to selectively provide regulated DC voltage and current to the electronic equipment. The apparatus may include an overload protector in the output circuitry which is visible from the housing exterior. The apparatus may include an output load cable connector comprising a hermaphroditic SAE step connector. The apparatus may include an auxiliary power port in electrical continuity with the integrated voltage regulator output portion. The apparatus may include an input power port in electrical continuity with the battery electrical connectors and the integrated voltage regulator input portion. The apparatus may include a plurality of power adapters electrically coupled to comprise a common power source and output.

The apparatus provides many advantages to known solutions, including ability to utilize selected existing tool battery systems for use by electronic equipment, ability to easily swap out depleted batteries with fully charged batteries, and the ability to provide single or multiple power sources from a single battery pack to an electronic device or multiple electronic devices.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

REFERENCE NUMBERS

Turning now descriptively to the drawings, in which similar reference characters denote similar elements throughout the several views, the figures illustrate the features of the present invention. With regard to the reference numerals used, the following numbering is used throughout the various drawing figures:

| Ref. Nr. | |
|---|---|
| 10 | First described embodiment |
| 12 | Housing |
| 14 | Mounting portion |
| 16 | Battery chamber |

| Ref. Nr. | |
|---|---|
| 18 | Voltage regulator first output leg |
| 20 | Voltage regulator |
| 24 | Adapter output cable |
| 28 | Overcurrent protector |
| 30 | Overcurrent protector cover |
| 32 | Tool battery |
| 44 | Battery chamber battery electrical connectors |
| 50 | Clamp portion |
| 52 | Rotational connector |
| 54 | Mounting bracket |
| 56 | Rotational connector |
| 58 | Clamp portion hinge |
| 62 | First mounting flange |
| 64 | Second mounting flange |
| 66 | Coupling first clamp member |
| 68 | Coupling second clamp member |
| 70 | First clamp member bushing |
| 72 | Second clamp member bushing |
| 74 | Common orthogonal axis |
| 110 | Second described embodiment |
| 110a & etc | Multiple adapters for ganging together |
| 112 | Adapter body housing |
| 116 | Battery chamber |
| 120 | Voltage regulator |
| 122 | DC input power cable |
| 124 | DC output power cable |
| 126 | SAE hermaphroditic step connector |
| 126a & etc | Additional SAE connectors |
| 128 | Circuit breaker |
| 130 | Circuit breaker cover |
| 136 | Hermaphroditic SAE step connector |
| 148 | Auxiliary DC power output 148 |
| 210 | Third described embodiment |
| 224 | Two-wire power cable |
| 226 | SAE hermaphroditic connector |

DETAILED DESCRIPTION

Before beginning a detailed description of the subject invention, mention of the following is in order. When appropriate, like reference materials and characters are used to designate identical, corresponding, or similar components in differing figure drawings. The figure drawings associated with this disclosure typically are not drawn with dimensional accuracy to scale, i.e., such drawings have been drafted with a focus on clarity of viewing and understanding rather than dimensional accuracy.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

As shown in FIGS. 1-9, a first embodiment of a power adapter 10 is provided. Power adapter 10 includes housing 12, mounting portion 14, battery chamber 16, integrated voltage regulator 20, and overcurrent protector 28.

Integrated voltage regulator 20 comprises a circuit board with a voltage regulator which receives DC power from an installed tool battery 32 and converts the tool battery power input to a DC output power with DC voltage (stepped up or stepped down) selected to support the field equipment ("DC Load"). A first output leg 18 of integrated voltage regulator 20 electrically couples to output cable 24 through overcurrent protector 28, output cable 24 including SAE step connector 26 at its terminal end to connect to a load.

In the embodiment, integrated voltage regulator 20 and downstream loads are protected from overload by overcurrent protector 28. In the embodiment, overcurrent protector 28 is a circuit breaker with a plunger which pops when tripped. Waterproof clear cover 30 allows the user to observe the state (on/tripped) of circuit breaker 28.

Housing 12 is made from an impact-resistant nonconductive plastic, sealed to prevent intrusion by moisture or dust, and includes a battery chamber 16 with electrical connectors 44 to receive and retain a tool battery 32. The particular shape and arrangement of battery chamber 16 and electrical connectors 44 are adapted to the particular tool battery or family of tool batteries selected for use. In the embodiment, tool battery 32 is a Makita BL1850B, rated at 18 VDC and 5000 mA-hr. Integrated voltage regulator 20 is mounted behind battery chamber 16.

Figure 11:
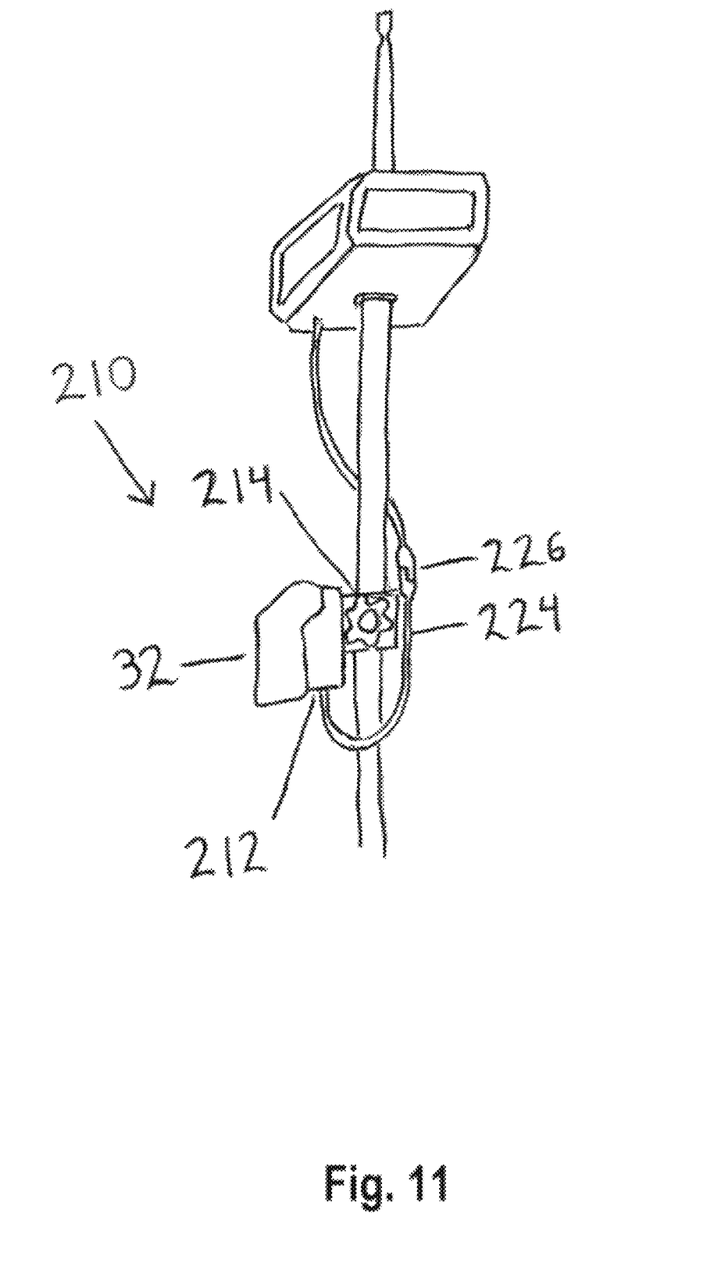
FIG. 11 shows a third embodiment mounted to a field survey GNSS receiver with a battery pack installed.

In the embodiment, mounting portion 14 is a universal mount adapted to couple power adapter 10 proximate the equipment to be powered, either to a stand (as shown in FIG. 11), a frame, cart or other convenient location. In the embodiment, mounting portion 14 includes clamp portion 50 to engage the equipment frame or stand and rotational connector 52 to clamp portion 50 to mounting bracket 54 projecting from housing 12. In the embodiment, rotational connector 56 is a threaded bolt defining a rotation axis which allows clamp portion 50 to be oriented at selected angles around the rotation axis. Clamp portion 50 includes hinge 58 rotatably coupling first and second clamp members 66 and 68, respectively, and threaded compression member 60 movably coupled through first and second clamp member bushings 70 and 72, respectively. Mounting bracket 54 includes a first mounting flange 62 and a second mounting flange 64 oriented orthogonally to first mounting flange 62, each including a mounting aperture, providing essentially universal mounting orientation for any type of mounting apparatus. First and second mounting flanges 62 and 64 are joined along their common orthogonal axis 74 to provide increased strength. Mounting bracket 54 could provide coupling for a magnetic coupler or other type of coupler adapted to the particular equipment.

Figure 1:
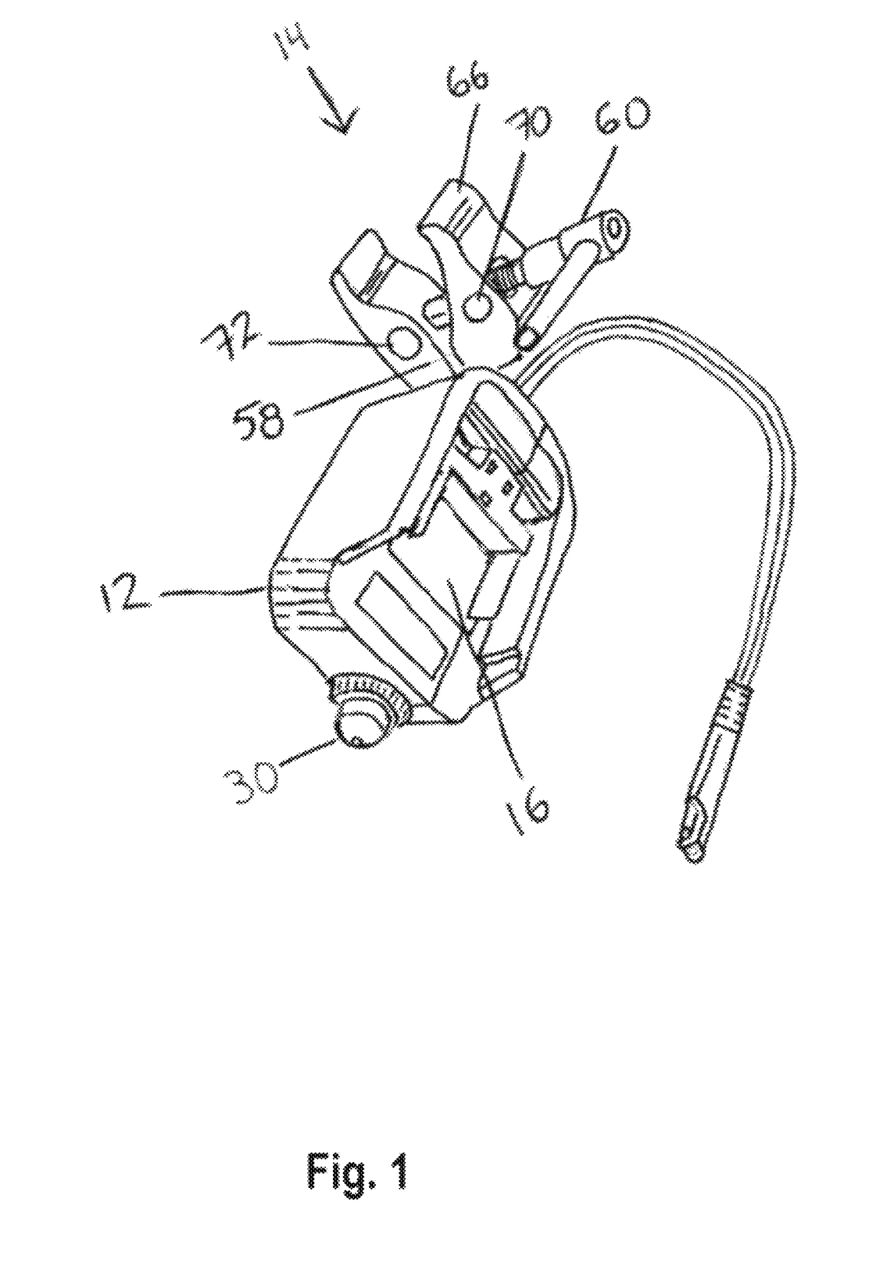
FIG. 1 shows a perspective view of a first embodiment with only one regulated output connector shown, without a battery pack installed.
Figure 2:
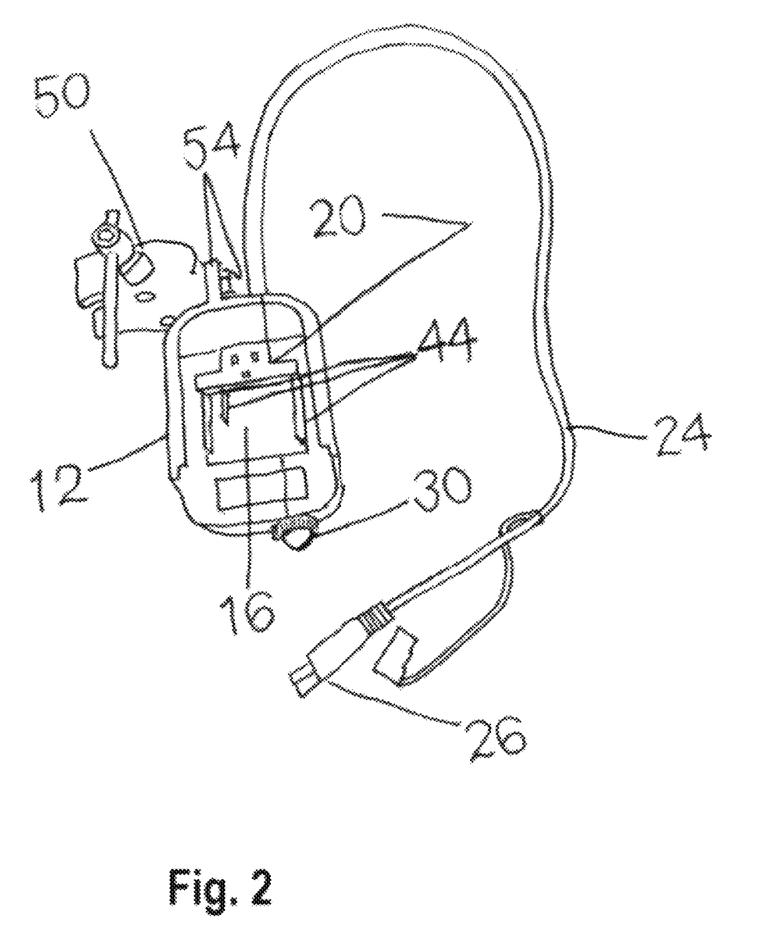
FIG. 2 shows a perspective view of a first embodiment with only one regulated output connector shown, without a battery pack installed.
Figure 3:
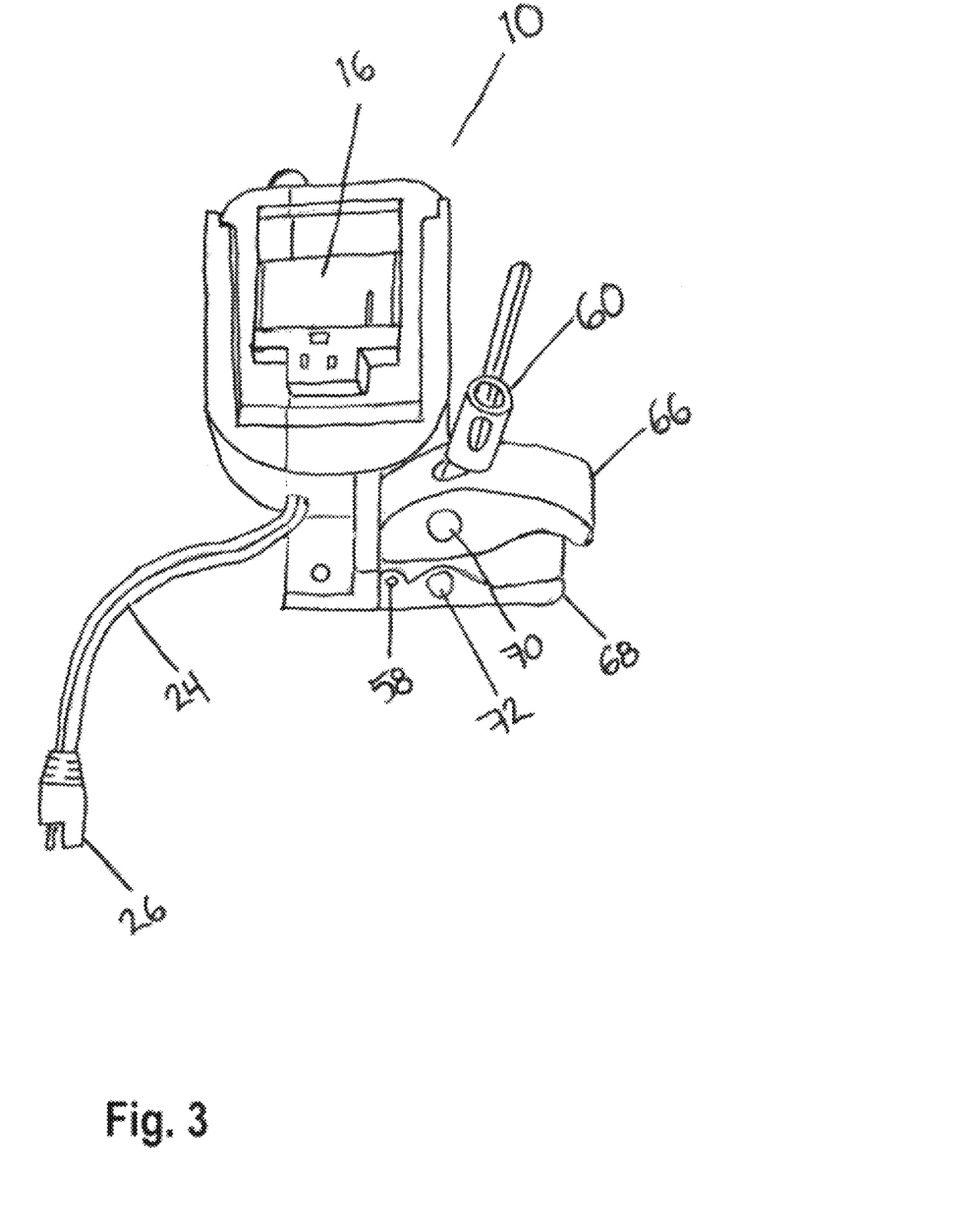
FIG. 3 shows a perspective view of a first embodiment with only one regulated output connector shown, without a battery pack installed.
Figure 4:
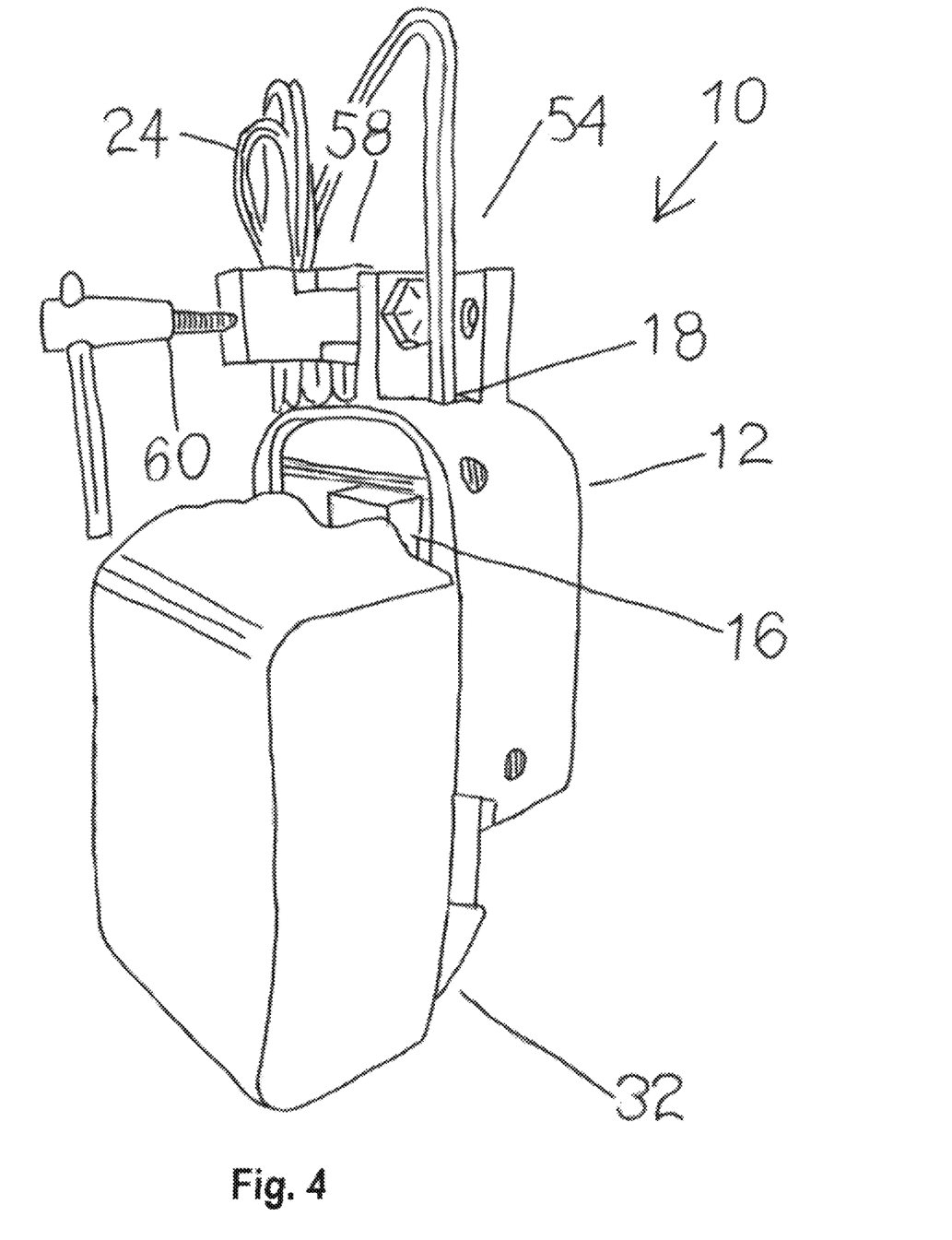
FIG. 4 shows a side perspective view of a first embodiment with a battery pack partially installed.
Figure 5:
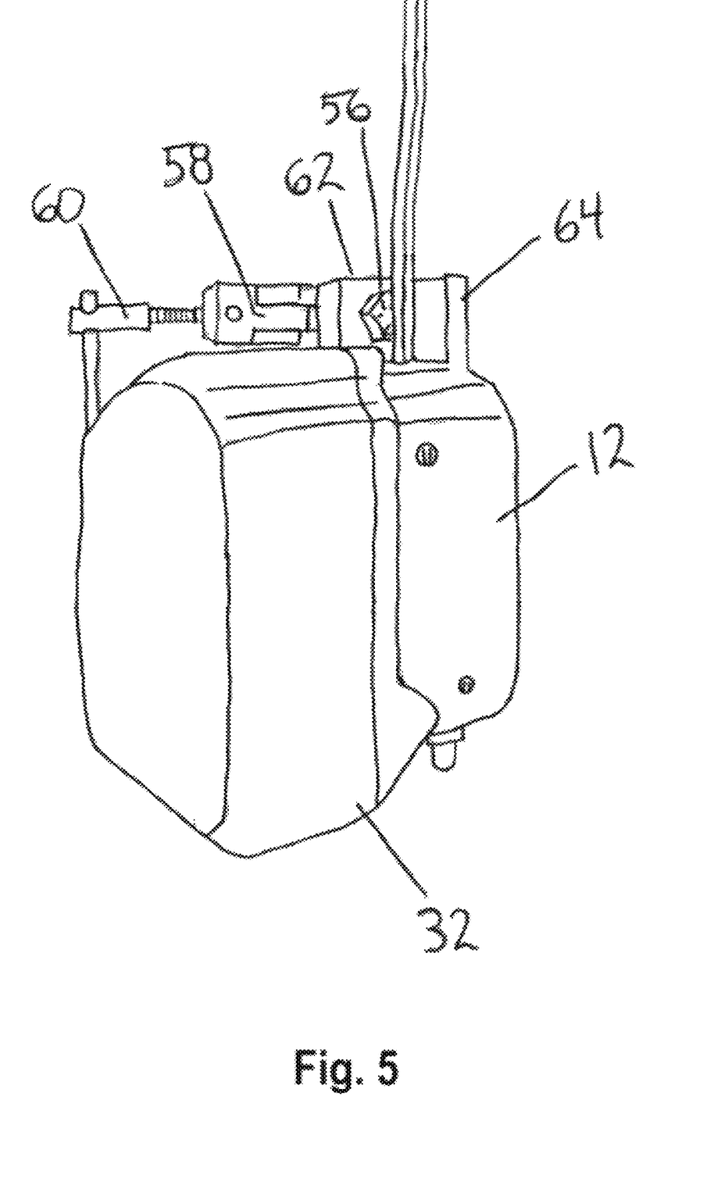
FIG. 5 shows a side perspective view of a first embodiment with a battery pack installed.
Figure 6:
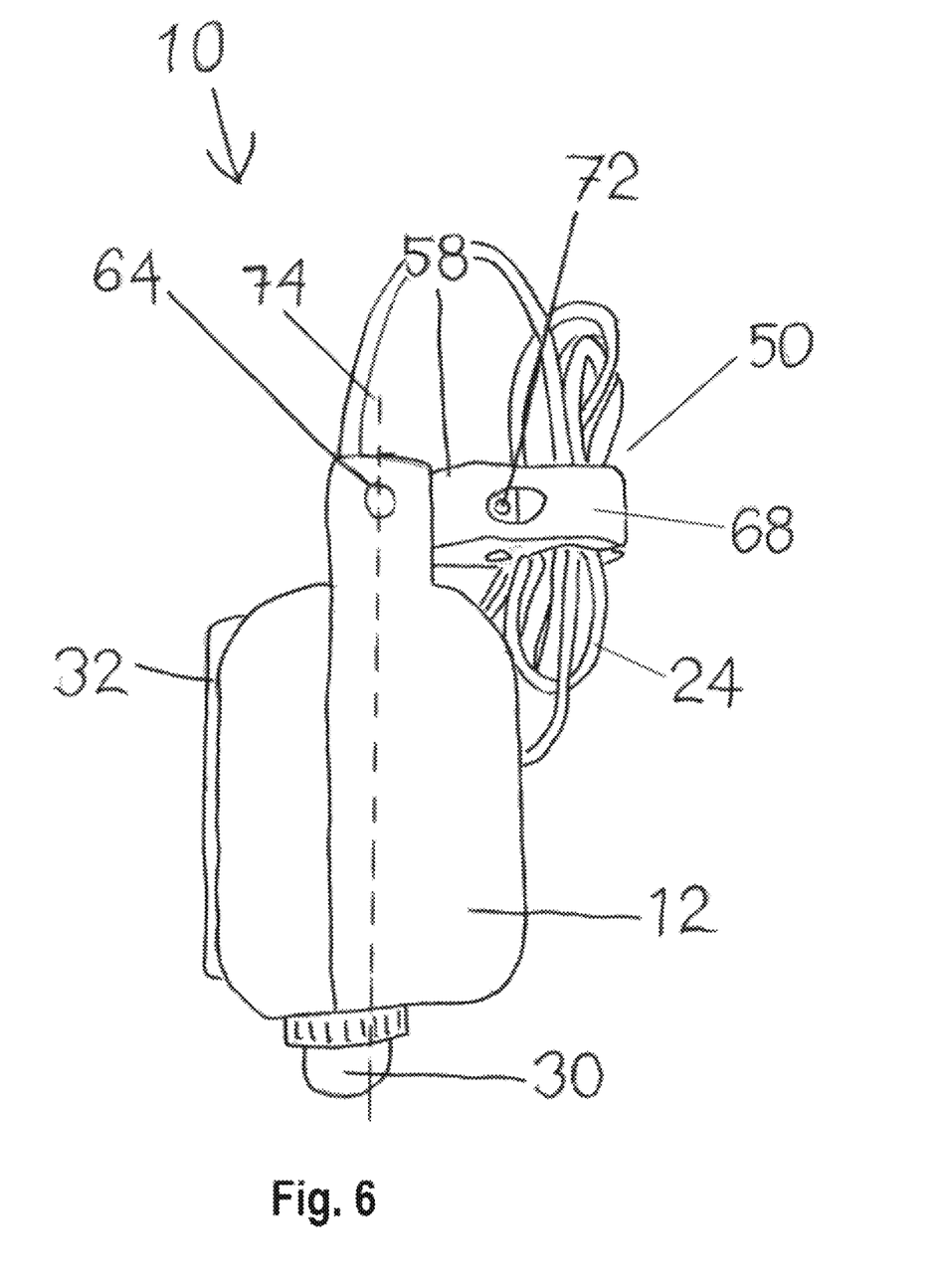
FIG. 6 shows aback side view of a first embodiment with a battery pack installed.
Figure 7:
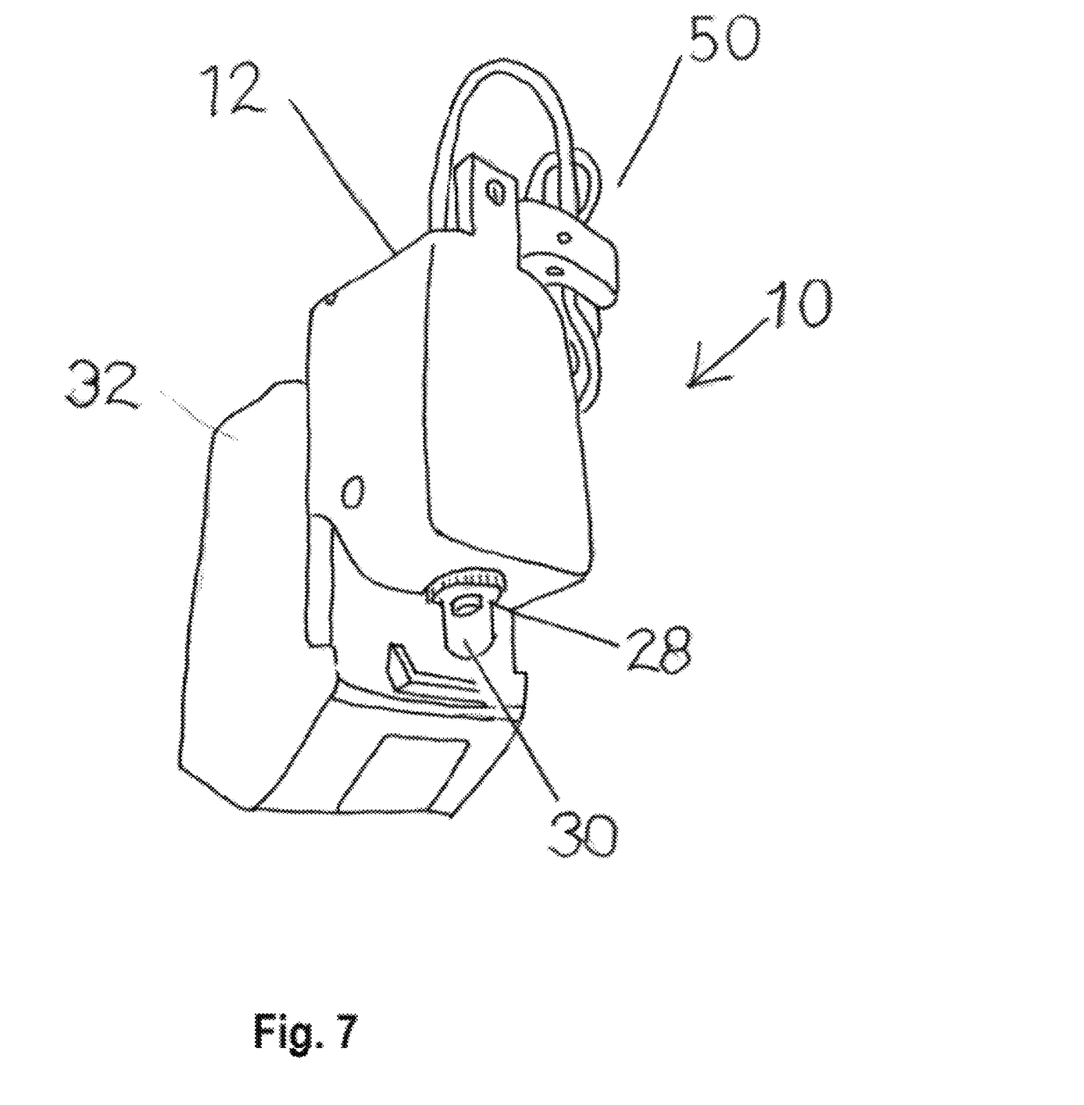
FIG. 7 shows a back side perspective view of a first embodiment with a battery pack partially installed.
Figure 8:
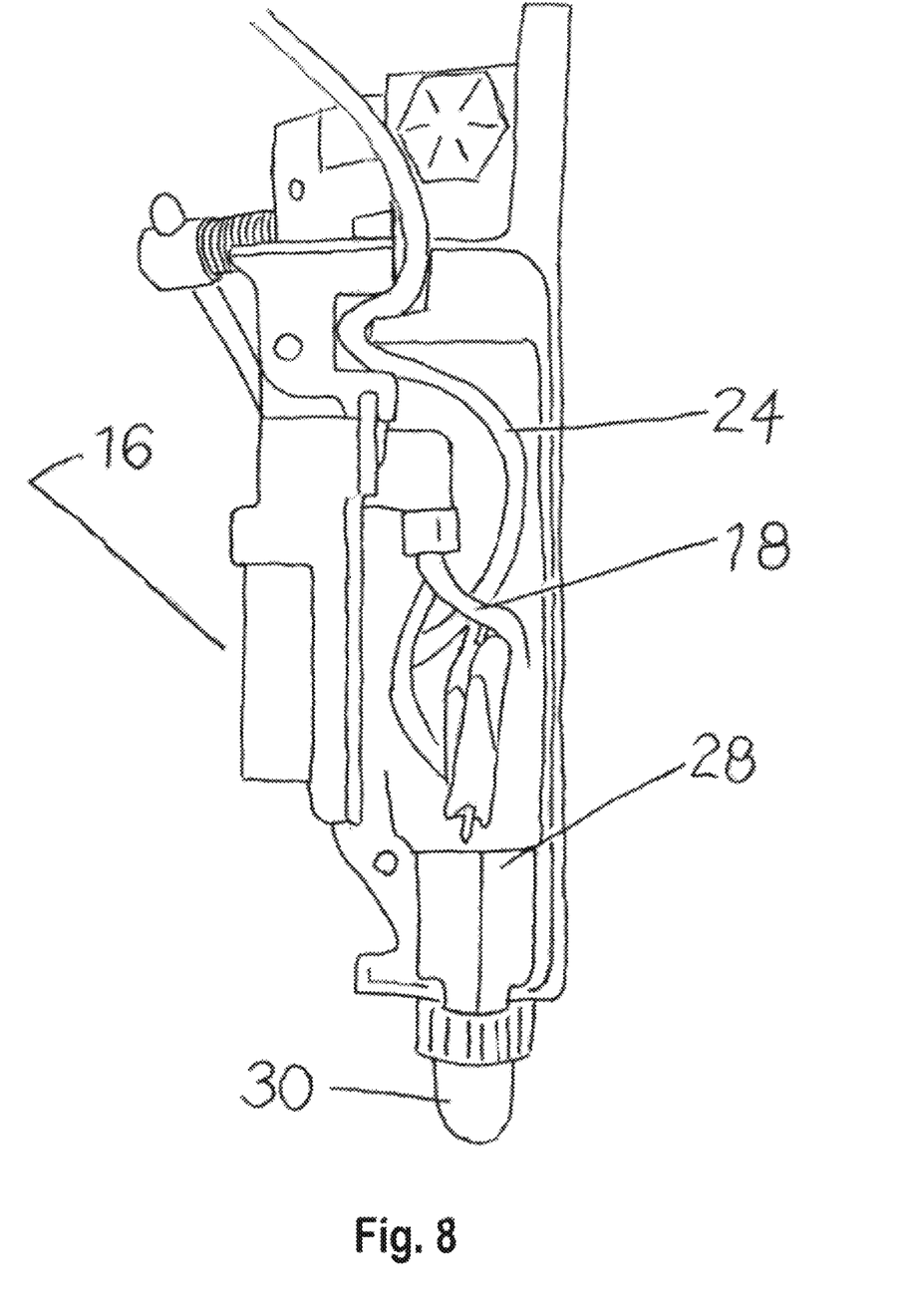
FIG. 8 shows a cutaway view of a first embodiment.
Figure 9:
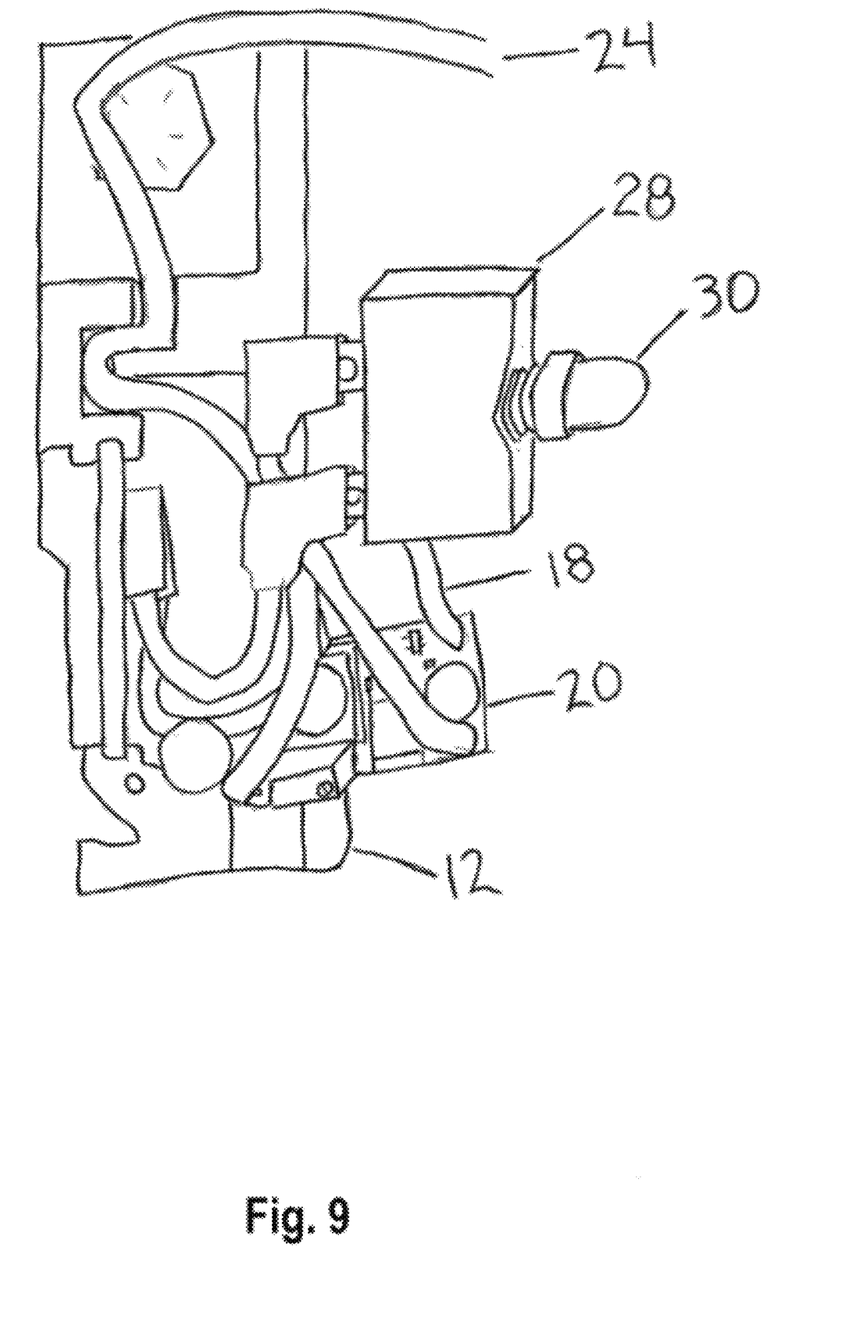
FIG. 9 shows a partially exploded cutaway view of a first embodiment.
Figure 10:
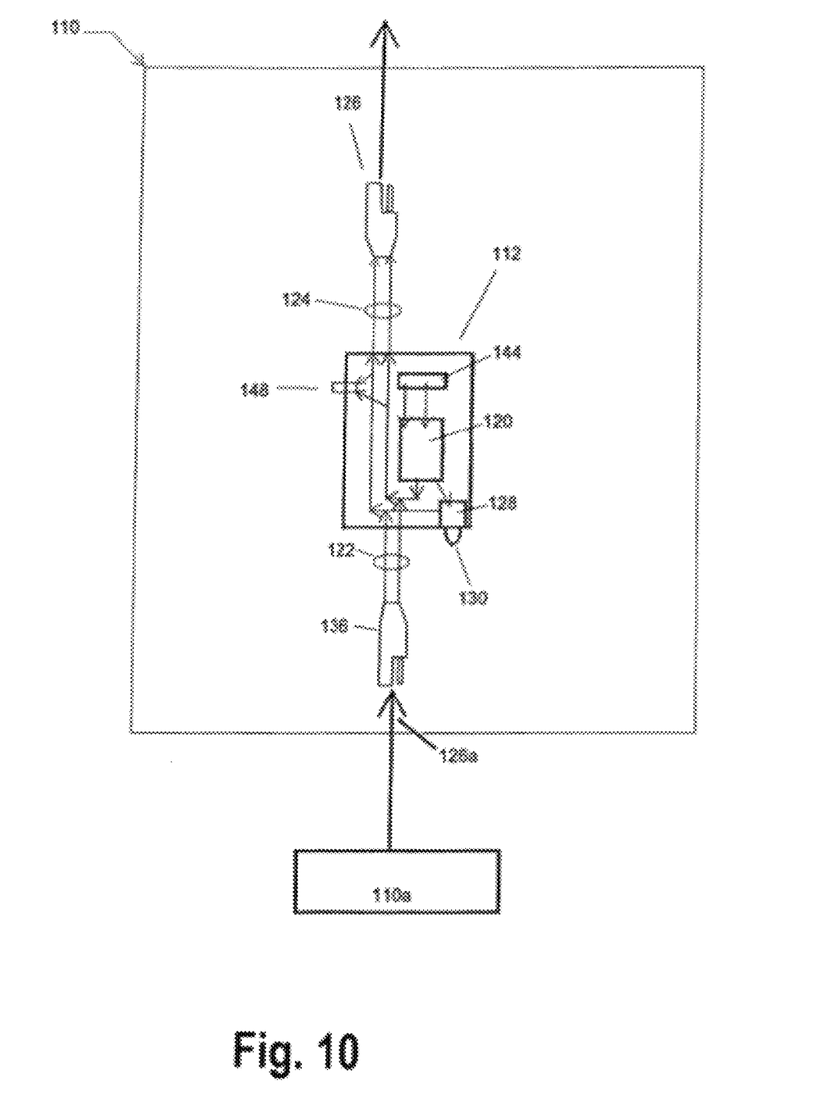
FIG. 10 shows functional schematic of a second embodiment.

Referring to FIG. 10, a functional schematic of a second embodiment 110 is shown. Body housing 112 contains a battery chamber 116 (not shown) with battery electrical connectors 144. Battery electrical connectors 144 provide electrical connection to the input side of integrated voltage regulator 120. In the embodiment, integrated voltage regulator 120 includes integral overcurrent protection. Integrated voltage regulator 120 produces a regulated and conditioned DC power output, at least one leg of which is electrically coupled through circuit breaker 128 to provide overcurrent protection to the DC Load to be powered. Circuit breaker cover 130 allows the user to observe the status of circuit breaker 128. The output side of integrated voltage regulator 120 is electrically coupled to two-wire DC output cable 124 which terminates at SAE step connector 126 to provide electrical connection to the DC Load to be powered. The output of integrated voltage regulator 120 is also tapped to provide auxiliary power port 148 for input or output DC power.

In the embodiment, multiple identical adapter units 110a (& etc) may be ganged together to provide greater battery capacity via two-wire DC input power cable 122 and hermaphroditic SAE step connector 136, connectable to an output connector 126a of an adapter unit 110a.

In the embodiment, power adapter 110a includes auxiliary IC power output 148, which provides a regulated DC power output directly to selected instruments or other equipment.

Referring to FIG. 11, a third embodiment of a power adapter 210 is shown connected to a field survey GNSS receiver with an installed 18 VDC battery pack 32. In the third embodiment, power adapter 210 receives 18 VDC power from battery pack 32 and outputs the battery power directly to the field equipment via two-wire power cable 224 to SAE hermaphroditic connector 226 connectable to the equipment.

Those skilled in the art will recognize that numerous modifications and changes may be made to the preferred embodiment without departing from the scope of the claimed invention. It will, of course, be understood that modifications of the invention, in its various aspects, will be apparent to those skilled in the art, some being apparent only after study, others being matters of routine mechanical, chemical and electronic design. No single feature, function or property of the preferred embodiment is essential. Other embodiments are possible, their specific designs depending upon the particular application. As such, the scope of the invention should not be limited by the particular embodiments herein described but should be defined only by the appended claims and equivalents thereof.

I claim:

1. A portable power adapter, comprising:
   a housing comprising an outer shell and a connection bracket projecting from the outer shell, the connection bracket including first and second connector flanges extending from the housing exterior and disposed orthogonal to each other, the first and second connector flanges connected along their orthogonal axis and each of the first and second connector flanges including a mounting aperture, the housing containing within it:
   a battery chamber adapted to receive and retain a selected battery pack, the battery chamber further including battery electrical connectors to provide electrical connection with the selected battery pack;
   an output load cable in electrical communication with the battery electrical connectors, the output load cable selectively connectable to a DC load;
   a circuit overload protector in electrical continuity with, and connected in series between, the battery electrical connectors and at least one wire of the output load cable;
   a viewing port coupled to the housing proximate the circuit overload protector so as to provide observation of the circuit overload protector state;
   wherein the output load cable extends outside the housing and further includes a terminal connector selected to electrically couple to a selected DC load; and,
   a mounting portion couplable to the first or second mounting bracket flange.

2. The apparatus of claim 1, further comprising:
   an integrated voltage regulator, the voltage regulator including an input portion in electrical continuity with the battery electrical connectors, an output portion in electrical continuity with an output load cable, the output load cable including at least a load and a line wire, and a converter portion in electrical continuity with the input portion and output portion; and,
   the circuit overload protector further disposed in electrical continuity between the voltage regulator output portion and at least one wire of the output load cable.

3. The apparatus of claim 1, further comprising:
   wherein the output load cable connector is a hermaphroditic SAE step connector.

4. The apparatus of claim 2, further comprising:
   an auxiliary power output port in electrical continuity with the integrated voltage regulator output portion.

5. The apparatus of claim 2, further comprising:
   an input power port in electrical continuity with the battery electrical connectors and the integrated voltage regulator input portion.

6. The apparatus of claim 5, further comprising:
   a plurality of power adapters electrically coupled in parallel to comprise a common power source and output.

* * * * *